United States Patent
Gannon et al.

(10) Patent No.: US 9,074,653 B2
(45) Date of Patent: Jul. 7, 2015

(54) MULTISTATE SWITCHABLE ENGINE MOUNT AND SYSTEM

(75) Inventors: Daniel G. Gannon, Milford, MI (US); Derek K. Hogland, Brighton, MI (US); Sam M. Jomaa, Dearborn, MI (US); Dennis J. Kinchen, Brighton, MI (US); Ping Lee, Kitchener (CA); Kenneth L. Oblizajek, Troy, MI (US); David J. Verbrugge, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1783 days.

(21) Appl. No.: 12/255,524

(22) Filed: Oct. 21, 2008

(65) Prior Publication Data

US 2010/0096789 A1    Apr. 22, 2010

(51) Int. Cl.
  *F16F 9/00*  (2006.01)
  *F16F 13/26* (2006.01)
  *B60K 5/12*  (2006.01)

(52) U.S. Cl.
  CPC .............. *F16F 13/262* (2013.01); *B60K 5/1266* (2013.01); *B60K 5/1283* (2013.01)

(58) Field of Classification Search
  CPC .................................. F16F 9/00; F16F 13/262
  USPC .............. 267/140.14, 140.11, 140.12–140.15
  See application file for complete search history.

(56) References Cited

U.S. PATENT DOCUMENTS

| | | | | |
|---|---|---|---|---|
| 4,432,441 A | * | 2/1984 | Kurokawa | 188/267 |
| 4,583,723 A | * | 4/1986 | Ozawa | 267/140.14 |
| 4,641,817 A | * | 2/1987 | Clark et al. | 267/140.13 |
| 4,650,170 A | * | 3/1987 | Fukushima | 267/140.14 |
| 4,733,758 A | * | 3/1988 | Duclos et al. | 188/267.1 |
| 4,789,142 A | * | 12/1988 | Hoying et al. | 267/140.15 |
| 4,793,599 A | * | 12/1988 | Ishioka | 267/140.14 |
| 4,901,986 A | | 2/1990 | Smith | |
| 4,969,632 A | * | 11/1990 | Hodgson et al. | 267/140.11 |
| 5,029,677 A | * | 7/1991 | Mitsui | 188/267.1 |
| 5,116,029 A | * | 5/1992 | Gennesseaux | 267/140.14 |
| 5,167,403 A | * | 12/1992 | Muramatsu et al. | 267/140.13 |
| 5,205,546 A | | 4/1993 | Schisler et al. | |
| 5,215,293 A | | 6/1993 | Muramatsu et al. | |
| 5,217,211 A | * | 6/1993 | Ide et al. | 267/140.13 |

(Continued)

FOREIGN PATENT DOCUMENTS

WO    2007029739 A1    3/2007

OTHER PUBLICATIONS

Chinese Office Action mailed Jun. 9, 2011 for Chinese Application No. 200910206188.4.

*Primary Examiner* — Robert A Siconolfi
*Assistant Examiner* — James Hsiao
(74) *Attorney, Agent, or Firm* — Ingrassia Fisher & Lorenz, P.C.

(57) ABSTRACT

A vehicle engine mount system comprises a housing and an inertia track assembly that forms a first fluid chamber with an upper compliant member and a second fluid chamber with the second end of the housing. The inertia track assembly has first and second passageways therethrough for conducting fluid between the first and second fluid chambers. The first passageway has a substantially greater flow resistance than the second. First and second switches are coupled to the first and second passageways, respectively, for selectively enabling the first and second switches to control fluid displacement between the first fluid chamber and the second fluid chamber.

17 Claims, 3 Drawing Sheets

(56) References Cited

U.S. PATENT DOCUMENTS

| | | | |
|---|---|---|---|
| 5,353,839 A * | 10/1994 | Kordonsky et al. | 137/806 |
| 5,398,917 A * | 3/1995 | Carlson et al. | 267/140.14 |
| 5,462,261 A | 10/1995 | Eckel et al. | |
| 5,769,402 A * | 6/1998 | Ide et al. | 267/140.14 |
| 5,927,699 A * | 7/1999 | Nakajima et al. | 267/140.14 |
| 6,036,183 A | 3/2000 | Lee et al. | |
| 6,095,486 A * | 8/2000 | Ivers et al. | 251/129.01 |
| 6,176,477 B1 * | 1/2001 | Takeo et al. | 267/140.11 |
| 6,422,545 B1 * | 7/2002 | Baudendistel et al. | 267/140.13 |
| 6,439,556 B1 * | 8/2002 | Baudendistel et al. | 267/140.15 |
| 6,491,290 B2 * | 12/2002 | Muramatsu et al. | 267/140.14 |
| 6,612,409 B2 * | 9/2003 | Lun et al. | 188/267.2 |
| 6,637,556 B1 * | 10/2003 | Lun | 188/267 |
| 6,659,436 B2 * | 12/2003 | Muramatsu et al. | 267/140.13 |
| 6,698,732 B2 * | 3/2004 | Takashima et al. | 267/140.13 |
| 6,808,168 B2 * | 10/2004 | Muramatsu et al. | 267/140.13 |
| 6,902,156 B2 * | 6/2005 | Muramatsu et al. | 267/140.15 |
| 7,048,264 B2 * | 5/2006 | Anzawa et al. | 267/140.13 |
| 7,188,830 B2 * | 3/2007 | Kato et al. | 267/140.14 |
| 7,194,344 B2 | 3/2007 | Gee et al. | |
| 7,210,674 B2 * | 5/2007 | Maeno et al. | 267/140.13 |
| 7,350,776 B2 * | 4/2008 | Muramatsu et al. | 267/140.14 |
| 7,416,173 B2 | 8/2008 | Tanaka | |
| 8,091,872 B2 * | 1/2012 | Koyama et al. | 267/140.14 |
| 2004/0084263 A1 * | 5/2004 | Kintz et al. | 188/267 |
| 2004/0150146 A1 * | 8/2004 | Takeo et al. | 267/140.14 |
| 2005/0127586 A1 * | 6/2005 | Maeno et al. | 267/140.13 |
| 2006/0038331 A1 | 2/2006 | Ogawa et al. | |
| 2007/0138718 A1 * | 6/2007 | Muraoka | 267/140.14 |
| 2007/0138719 A1 * | 6/2007 | Ichikawa et al. | 267/140.14 |
| 2009/0008195 A1 | 1/2009 | Ueki | |

* cited by examiner

|  | IDLE PORT | |
|---|---|---|
| VACUUM STATE | ON | OFF |
| BOUNCE PORT ON | IDLE IN DRIVE | HIGHWAY |
| BOUNCE PORT OFF | 4th STATE | DRIVEAWAY |

MULTISTATE SWITCHABLE ENGINE MOUNT AND SYSTEM

TECHNICAL FIELD

This invention relates generally to engine mounts and, more particularly, to a switchable multistate powertrain mounting system.

BACKGROUND OF THE INVENTION

Conventional powertrain mounting systems generally operate to provide engine isolation and concurrently control engine motion. One common type of engine mount, the elastomeric engine mount, provides a fairly constant dynamic properties (e.g. elastic (K') and loss (K") rates) across the range of frequencies typically encountered in a specified application. The level of damping is generally increased or decreased by preselecting an elastomeric material having different properties and/or dimensions. Once constructed, set damping rate characteristics are provided regardless of the actual operating conditions encountered by the mount.

Hydraulic mounts were developed, in part, due to the desirability of providing a mount having a high damping coefficient for relatively high amplitude inputs and a relatively low damping coefficient for lower amplitude inputs. A typical hydraulic mount includes a pumping chamber enclosed by relatively thick elastomeric walls having an orifice track opening to the chamber and extending to a reservoir that is typically bounded by a flexible diaphragm. The reservoir is typically located on the opposite side of a partition from the pumping chamber. During compression, fluid is pressurized in the pumping chamber and flows through the orifice track to the reservoir. During rebound, fluid is drawn back to the pumping chamber from the reservoir. Mount dynamic stiffness and damping performance are determined by characteristics such as, for example, pumping chamber geometry, chamber wall material, and orifice track properties.

Additional increases in the performance characteristics of hydraulic mounts at selected frequency ranges were achieved by employing electronic control of the dynamic characteristics of the mount. This provided a preprogrammed ability to change the response of the mount to optimize dynamic performance. For example, in one known type of electronically controlled mount, a solenoid varies an orifice to provide fluid flow control between the pumping chamber and the reservoir of the mounts. In addition, engine mounting systems utilizing vacuum-driven switchable liquid-filled engine mounts were developed to provide different dynamic characteristics by selectively introducing into the chambers of the mount either (1) a vacuum from the intake manifold of an engine or (2) atmospheric pressure. Thus far, however, such engine mounts are capable of assuming only two states of dynamic stiffness and damping.

It would therefore be desirable to provide a switchable engine mount capable of providing at least three distinctive states with unique dynamic characteristics for use in an improved switchable powertrain mounting system. Furthermore, it would be desirable to provide a switchable powertrain mounting system that provides at least three selectable distinctive states based on the operating conditions of the vehicle. Other desirable features and characteristics will become apparent from the following detailed description taken in conjunction with the accompanying drawings and the foregoing technical field and background.

SUMMARY OF THE INVENTION

An engine mount system is provided for managing vehicular vibrations. A housing has a first end that includes a compliant member a second end coupled to a vehicle structure. An inertia track assembly is coupled within the housing that forms a first fluid chamber with the first compliant member and a second fluid chamber with the second end. The inertia track assembly has at least first and second passageways therethrough for conducting fluid between the first and second fluid chambers. The first passageway has a substantially greater flow resistance than the second passageway. First and second switches coupled to the first and second passageways, respectively, are provided for selectively enabling the first and second switches to control fluid displacement between the first fluid chamber and the second fluid chamber.

An engine mount is provided for managing vehicle vibration. A first four-state engine mount has a first port and a second port. A second four-state engine mount has a third port and a fourth port. A first solenoid valve has an output coupled to the first port and to the third port and has a first input configured to be coupled to a source of pressure and a second input configured to be coupled to atmospheric pressure. A second solenoid valve has an output coupled to the second port and the fourth port and has a first input configured to be coupled to the source of pressure and a second input configured to be coupled to atmospheric pressure. A processor has at least one input indicative of an operational condition and has a first output coupled to an input of the first solenoid valve and has a second output coupled to an input of the second solenoid valve to selectively apply the pressure to the first and third ports and second and fourth ports to achieve four distinct states of stiffness and damping.

DESCRIPTION OF THE DRAWINGS

The present invention will hereinafter be described in conjunction with the following drawing figures, wherein like numerals denote like elements, and.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that FIGS. 1-5 are merely illustrative and may not be drawn to scale.

Figure 1:
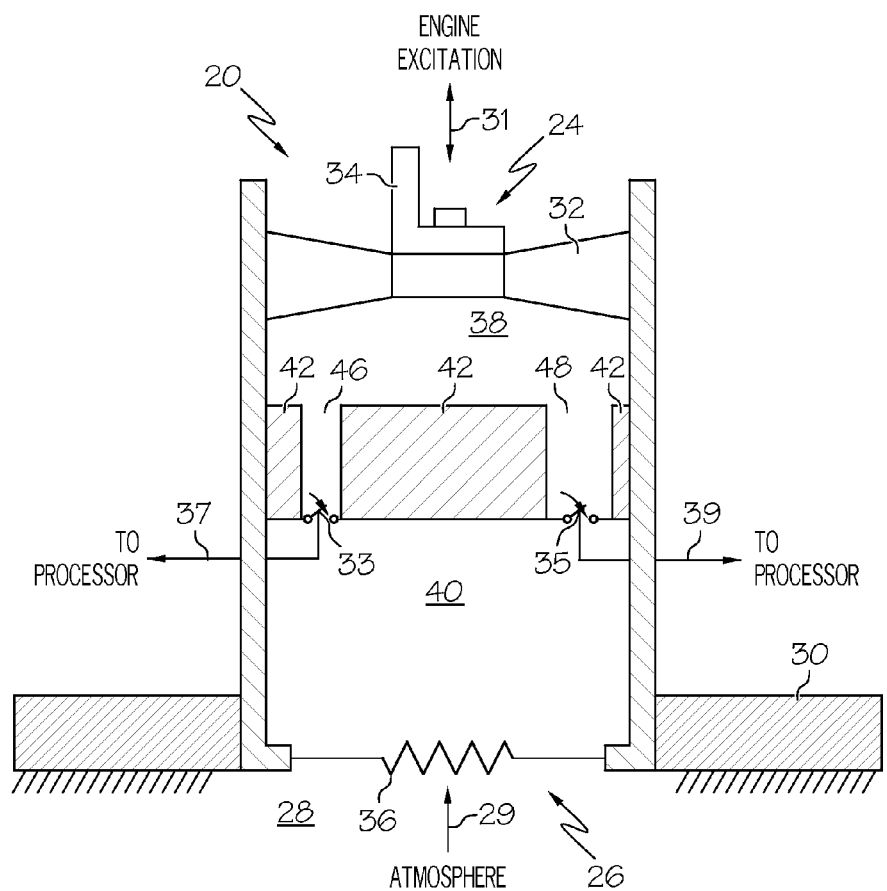
FIG. 1 is a functional diagram of a multi-state engine mount in accordance with an exemplary embodiment.

FIG. 1 is a functional diagram of a multi-state engine mount in accordance with an exemplary embodiment. It comprises a housing 22 having a first end (e.g. an upper end 24) and a second end (e.g. a lower end 26). Housing 22 is fixedly coupled to a structure 28 of a vehicle by means of a mounting structure 30 in accordance with known techniques. The upper end 24 of engine mount 20 is enclosed by a resilient upper compliance 32 (e.g. rubber) coupled to an engine attachment assembly 34 (e.g. a bracket). Relative motion between the structure of the vehicle and engine attachment is indicated by arrow 31. A lower compliance (e.g. a bellows 36) is coupled to the lower end 26 of mount 20 that is exposed to a first source of pressure (e.g. atmospheric) indicated by arrow 29.

Within mount 20 is a first fluid chamber (e.g. upper fluid chamber 38) and a second fluid chamber (e.g. lower fluid chamber 40) each filled with a fluid such as liquid glycol. Upper and lower fluid chambers 38 and 40, respectively, are fluidly coupled together by means of an inertia track assembly 42 that comprises a first channel 46 and a second channel 48. A first switch assembly 33 is configured to affect the volumetric dilation of the upper chamber thus opening and closing first channel 46 by means of a control signal applied to input 37. Similarly, a second switch assembly 35 is configured to open and close second channel 48 in response to an appropriate signal at input 39. Inputs 37 and 39 are coupled to a processor as shown. First channel 46 is configured to have a greater resistance to flow than does second channel 48 as is graphically represented by the smaller width of first channel 46. This may be achieved by making channel 48 shorter with a greater cross-section.

The operation of engine mount 20 may be described as follows. In response to engine or road excitation, fluid is pushed by upper compliance 32 from upper fluid chamber 38 to lower fluid chamber 40. As alluded to previously, the degree of dynamic stiffness and damping of engine mount 20 depends, in part, on the ease with which the fluid flows between upper fluid chamber 38 and the lower fluid chamber 40 and the masses of fluid in the first channel 46 and second channel 48. The fluid in first channel 46 or second channel 48 participates in a resonant system having frequency dependent upon the volumetric dilation of the chambers, and fluid volumetric displacements based on such properties as the mass of fluid in the channels and elasticity of compliant elements 32 and 36. Since ease of flow through channels 46 and 48 depends on channel length, cross-section, surface friction, and fluid entry and exit area constrictions and refractions, the channels can also be tuned to provide a differential resistance to flow.

Thus, mount 20 can be configured to exhibit varying levels of dynamic stiffness and damping by independently opening and closing switches 33 and 35 in a programmed fashion. Thus, the mount shown in FIG. 1 exhibits four distinct states of dynamic stiffness and damping.

It should be clear that the mount shown in FIG. 1, particularly the switches, may be implemented in a variety of ways; e.g. electronic, pneumatic, mechanical, electromechanical, hydro-mechanical, etc. and that they represent functional switches rather than physical ones. One such implementation is shown in FIG. 2.

Figure 2:
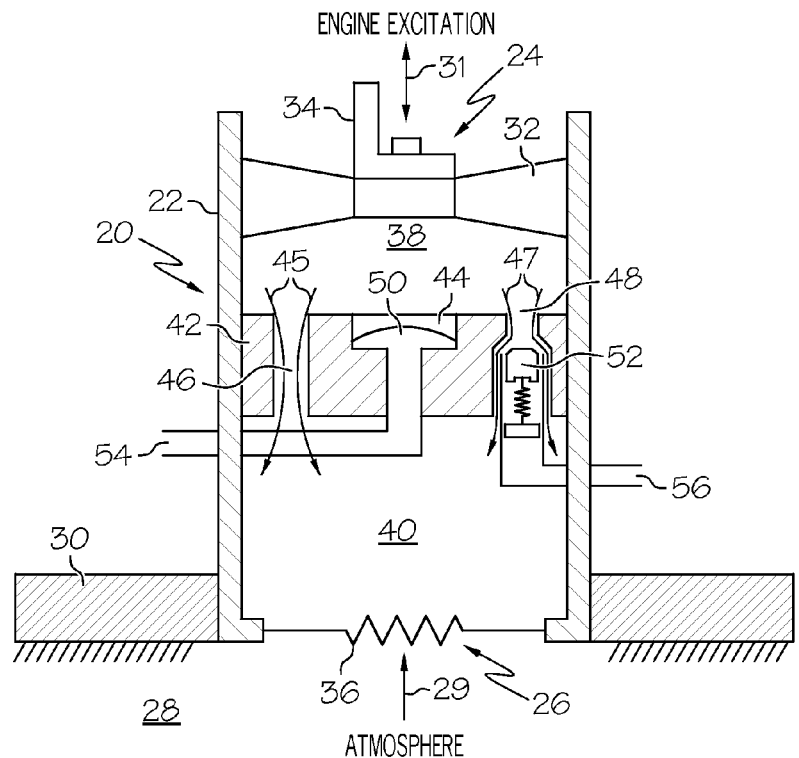
FIG. 2 is a schematic cross-sectional view of an exemplary engine mount in accordance with an exemplary embodiment.

FIG. 2 is a functional cross-sectional view of an engine mount embodying the teachings described in connection with FIG. 1. Like elements are denoted by like reference numerals. Engine mount 20 comprises a housing 22 having a first end (e.g. an upper end 24) and a second end (e.g. a lower end 26). Housing 22 is fixedly coupled to a structure 28 of a vehicle by means of a mounting structure 30 in accordance with well known techniques. The upper end 24 of engine mount 20 is enclosed by a resilient upper compliance 32 (e.g. rubber) coupled to an engine attachment assembly 34 (e.g. a bracket). As previously stated, relative motion between the structure of the vehicle and engine attachment is indicated by arrow 31; and a lower compliance (e.g. a bellows 36) is coupled to the lower end 26 of mount 20 that is exposed to a first source of pressure (e.g. atmospheric) indicated by arrow 29.

Within mount 20 is a first fluid chamber (e.g. upper fluid chamber 38) and a second fluid chamber (e.g. lower fluid chamber 40) each filled with a fluid such as liquid glycol. Upper and lower fluid chambers 38 and 40, respectively, are fluidly coupled together by means of an inertia track assembly 42 that comprises a resilient decoupler 44 (e.g. a compliant membrane), a first fluid track (e.g. a bounce fluid channel 46), a second fluid track (e.g. an idle fluid channel 48), and a vacuum chamber (e.g. a bounce vacuum chamber 50). An idle track bypass mechanism 52 is positioned within housing 22 proximate idle fluid channel 48 for opening and closing idle fluid channel 48 as will be further described below. Finally, a first vacuum port 54 (e.g. a bounce vacuum port) through housing 22 couples either a first pressure (e.g. atmospheric) or a second pressure (e.g. a vacuum) to bounce vacuum chamber 50, and a second vacuum port 56 (e.g. an idle vacuum port) through housing 22 couples either the first pressure or the second source of pressure to idle track bypass mechanism 52. Vacuum, as used herein is intended to mean a lower pressure (below atmospheric).

The operation of engine mount 20 may be described as follows. In response to engine or road excitation, fluid is pushed by upper compliance 32 from upper fluid chamber 38 to lower fluid chamber 40. As alluded to previously, the degree of dynamic stiffness and damping of engine mount 20 depends, in part, on the ease with which the fluid flows between the upper fluid chamber 38 and the lower fluid chamber 40 and the masses of fluid in the bounce fluid channel 46 and idle fluid channel 48. The fluid in bounce fluid channel 46 or idle fluid channel 48 participates in a resonant system whose frequency is based on such properties as the mass of fluid in the track, elasticity of compliant elements 32 and 36, the volumetric dilation of the chambers, and fluid volumetric displacements. Since ease of flow through channels 46 and 48 depends on track length, cross-section, surface friction, and fluid entry and exit area constrictions and refractions, the tracks can also be tuned to provide a differential resistance to flow.

At speeds less than or equal to a predetermined speed, for example five miles-per-hour (mph) (hereinafter referred to as the idle-in-drive state), the second pressure (e.g. vacuum) is applied to both the bounce vacuum port 54 and the idle vacuum port 56. This causes decoupler 44 to be constrained against a bottom wall of bounce vacuum chamber 50, and idle fluid channel 48 to be opened. Fluid from upper fluid chamber 38 flows through idle fluid channel 48 as indicated by arrows 47 rather than through bounce fluid channel 46 because the dynamic resistance of the fluid column in bounce fluid channel 46 is designed to be greater than that of the fluid column in idle fluid channel 48. For example, idle fluid channel 48 may have a larger cross-sectional area and a smaller flow length than does bounce inertia channel 46. That is, the ratio of the cross-sectional area to the length of the idle inertia track 48 is greater than that of bounce inertia channel 46. Accordingly, the resonant frequency is higher with flow through the idle channel 48 than with flow through the bounce inertia channel 46. This leads to a favorable reduction in the dynamic stiffness at a targeted range of frequencies that can be aligned with disproportional large periodic engine excitation typically encountered during idle operation.

At speeds between about five mph and 50 mph (hereinafter referred to as the driveaway state), the first pressure is applied to both the bounce port 54 and the idle port 56. Thus, decoupler 44 is permitted to breathe in response to external excitations of upper compliance 32, and no fluid flows through idle fluid channel 48. In this case, the mount exhibits a low dynamic stiffness to provide maximum isolation over a frequency range encountered in the vehicle speed range.

At speeds greater than approximately fifty mph (hereinafter referred to as the highway cruise state), the second pressure is applied to the bounce vacuum port 54, but is not applied to the idle vacuum port 56, which remains at the first pressure (atmospheric). Thus, decoupler 44 is fully constrained against a bottom wall of bounce chamber 50, and fluid is prevented from flowing through idle fluid channel 48. Fluid is forced to flow through bounce channel 46 as indicated by arrows 45. Thus, the mount provides very high dynamic stiffness to attenuate smooth road shake on the vehicle floor and at the steering wheel.

Finally, when the second pressure (e.g. vacuum) is applied to idle port 56 but not to the bounce port 54, idle fluid channel 48 is opened and decoupler 44 is not constrained. Thus, decoupler 44 is unconstrained, and fluid is allowed to flow through idle track 48. Therefore, the mount is placed in a fourth state that provides low dynamic stiffness and damping over an extended frequency range.

Figure 3:
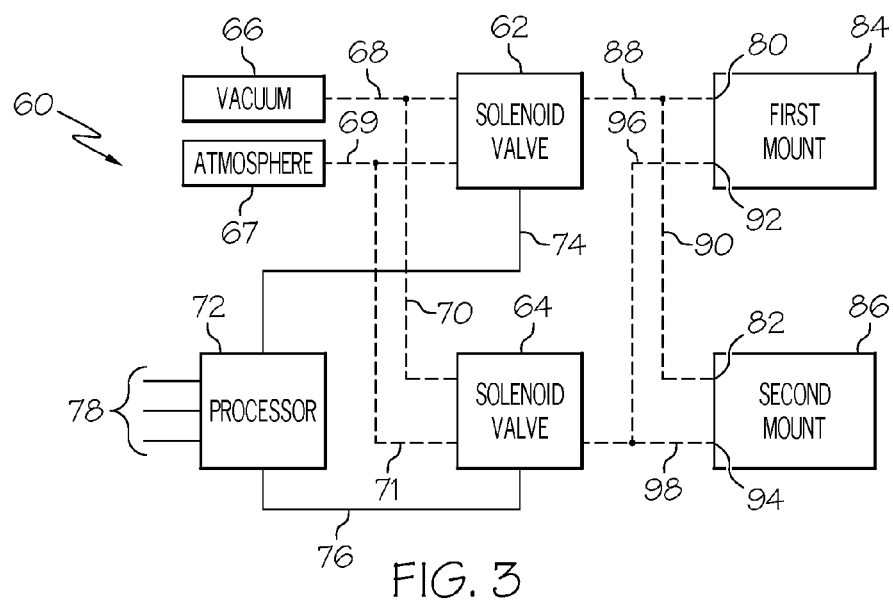
FIG. 3 is a block diagram of a switchable powertrain mounting system that provides at least three distinctive stiffness and damping states in accordance with an exemplary embodiment.

FIG. 3 is a block diagram of a powertrain mounting system 60 for providing at least three distinctive states of stiffness or damping based on vehicle operating conditions such as, for example, vehicle speed. By way of example only, a first state, (the idle-in-drive state) may be associated with speeds of five mph or less, a second state, (the driveaway state), may be associated with speeds greater than five mph up to fifty mph, and a third state, (the highway cruise state), may be associated with speeds greater than fifty mph. A fourth state may be achieved that is essentially a combination of the idle-in-drive state and the driveaway state. It should be clear, however, that different speeds and conditions may be associated with each state depending on the type of vehicle, its intended application, etc.

First and second solenoid valves, 62 and 64 respectively, each have a first input coupled to a vacuum source 66 via tubes 68 and 70 respectively, a second input coupled to a source of atmosphere 67 via tubes 69 and 71 respectively, and a third input coupled to processor 72 via conductors 74 and 76 respectively. A plurality of input signals 78 representative of vehicle operational conditions are processed within processor 72 and thus affect the manner in which processor 72 controls solenoid valves 62 and 64. Processor 72 may comprise one or more processors typically found on a vehicle; for example, a chassis control module. Vacuum source 66 may comprise the vehicle's engine vacuum source.

Solenoid valve 62 selectively communicates either a vacuum from vacuum source 66 or atmospheric pressure from source 67 to the idle ports 80 and 82 of first mount 84 and second mount 86, respectively, by means of tubes 88 and 90. Similarly, solenoid valve 64 communicates a vacuum from vacuum source 66 or atmospheric pressure from source 67 to the bounce ports 92 and 94 of first mount 84 and second mount 86, respectively, via tubes 96 and 98, respectively. First mount 84 and second mount 86 are of the type described above in connection with FIGS. 1 and 2. Thus, referring to FIGS. 3 and 4, by monitoring the input signals 78 representative of operational conditions, processor 72 may control solenoid valves 62 and 64 to conduct a vacuum to both bounce ports 92 and 94 to place mounts 84 and 86 in the highway cruising mode, and provide no vacuum to any of the idle ports 80 and 82 or the bounce ports 92 and 94 to place mounts 84 and 86 in the driveaway mode. Similarly, processor 72 may control solenoid valves 62 and 64 to provide a vacuum to bounce ports 92 and 94, and idle ports 80 and 82 to place mounts 84 and 86 in the idle-in-drive modes, or only to idle ports 80 and 82 to achieve the fourth state mode. Of course, it should be clear that FIG. 4 represents only one exemplary example of how the driving modes may be assigned and that other driving conditions 78 may be factors.

Figures 4, 5:
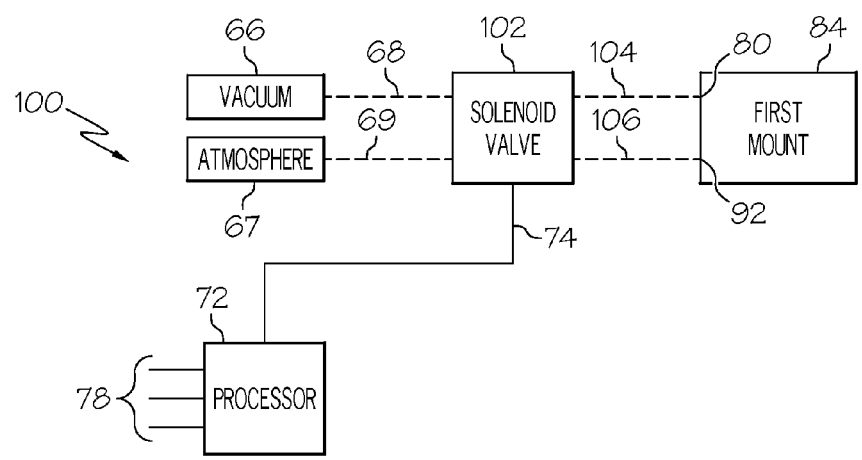
FIG. 4 is a state-table describing the operation of the mounting system shown in FIG. 3.
FIG. 5 is a block diagram of a switchable powertrain mounting system in accordance with a further embodiment.

FIG. 5 is a block diagram of a powertrain mounting system 100 in accordance with another exemplary embodiment. Like elements are identified with like reference numerals. In this embodiment, however, a single solenoid valve 102 is configured to provide either a vacuum or atmospheric pressure to idle port 80 and/or bounce port 82 of a single mount (e.g. mount 84) via tubes 104 and 106, respectively.

Thus, there has been described an engine mount and a powertrain mount system that provides at least three distinct states of damping or stiffness based on vehicular operating conditions. Of course, changes in form and details may be made by one skilled in the art without departing from the scope of the invention. For example, while the application of a vacuum has been employed to control decoupler 44 (FIG. 1) and open idle fluid channel 48, the use of electrical devices to perform these functions would be well within the purview of one skilled in the art. In addition, the vehicle speed associated with the highway cruising, driveaway, idle-in-drive, and fourth state modes may be selected as appropriate for a given vehicle, application, and set of operating conditions. Furthermore, additional vehicle inputs such as engine speed, transmission gear state, vehicle acceleration, road condition, etc., could be provided to processor 72 for controlling the mounts.

What is claimed is:

1. An engine mount system for managing vehicular vibrations, comprising:
   a housing having a first end and a second end, the second end coupled to a vehicle structure;
   a first compliant member coupled to the housing proximate the first end;
   an inertia track assembly coupled within the housing forming a first fluid chamber with the first compliant member and forming a second fluid chamber with the second end, the inertia track assembly having at least first and second passageways there through for conducting fluid between the first fluid chamber and the second fluid chamber, the first passageway having a substantially greater flow resistance than the second passageway and the second passageway having a substantially shorter length than the first passageway, the inertia track assembly including a first vacuum chamber and an idle-track bypass mechanism disposed in the second passageway for opening and closing the second passageway;
   a first port in communication with the first vacuum chamber;
   a second port in communication with the idle-track bypass mechanism; and
   first and second switches coupled to the first and second passageways, respectively, for selectively enabling the first and second passageways to control fluid displacement between the first fluid chamber and the second fluid chamber, wherein a first pressure is applied to the first port and a second pressure is applied to the second port in a highway cruise state of the vehicle and the first pressure is different than the second pressure.

2. An engine mount system according to claim 1 wherein the second passageway has a substantially larger cross-section than the first passageway to achieve a lower resistance to flow.

3. An engine mount system according to claim 1 further comprising a processor coupled to the first and second switches, the processor configured to selectively open and close the first and second switches to open and close the first and second passageways and create at least three distinct states of stiffness and damping.

4. An engine mount system according to claim 3 wherein the processor is configured to create four distinct states of stiffness and damping.

5. An engine mount system according to claim 3 wherein the second switch comprises a valve that selectively opens and closes the second passageway.

6. An engine mount system according to claim 3 wherein the first switch comprises a decoupler positioned on the inertia track assembly and capable of selectively assuming (1) a stationary position enabling direct fluid displacement between the first fluid chamber and the second fluid chamber through at least one of the first passageway and the second passageway, and (2) a moveable position that causes volumetric dilation of the first fluid chamber that hinders fluid displacement through the first passageway and the second passageway.

7. An engine mount system for managing vehicular vibrations, comprising:
a housing having a first end and a second end, the second end coupled to a vehicle structure;
a first compliant member coupled to the housing and proximate the first end and exposed to vehicular vibrations;
an inertia track assembly coupled within the housing, the inertia track assembly forming a first fluid chamber with the first compliant member and forming a second fluid chamber with the second end, the inertia track assembly having at least first and second passageways therethrough for conducting fluid between the first fluid chamber and the second fluid chamber, the first passageway having a substantially greater flow resistance than the second passageway, the inertia track assembly including a first vacuum chamber and an idle-track bypass mechanism disposed in the second passageway for opening and closing the second passageway;
a decoupler positioned on the inertia track assembly and exposed to the first fluid chamber and capable of selectively assuming (1) a stationary position enabling direct fluid displacement between the first fluid chamber and the second fluid chamber through at least one of the first passageway and the second passageway, and (2) a moveable position that causes volumetric dilation of the first fluid chamber that hinders fluid displacement through the first passageway and the second passageway;
a first port in communication with the first vacuum chamber; and
a second port in communication with the idle-track bypass mechanism, a valve in communication with the first port and the second port and having a first input coupled to a source of a first pressure and a second input coupled to a source of a second pressure; and
a processor in communication with the valve and the processor controls the valve to apply the first pressure to the first port and the second pressure to the second port in a highway cruise state of the vehicle, the first pressure different than the second pressure.

8. An engine mount system according to claim 7 wherein the first vacuum chamber positions the decoupler.

9. An engine mount system according to claim 8 wherein the first vacuum chamber is configured to permit the decoupler to selectively assume (1) a stationary position enabling direct fluid displacement between the first fluid chamber and the second fluid chamber through at least one of the first passageway and the second passageway, and (2) a moveable position that causes volumetric dilation of the first fluid chamber that hinders fluid displacement through the first passageway and the second passageway.

10. An engine mount system according to claim 9 wherein the engine mount exhibits a first distinct state of stiffness and damping when the valve opens the second passageway and the decoupler is in the stationary position.

11. An engine mount system according to claim 10 wherein the engine mount exhibits a second distinct state of stiffness and damping when the valve closes the second passageway and the decoupler is in the moveable position.

12. An engine mount system according to claim 11 wherein the engine mount exhibits a third distinct state of stiffness and damping when the valve closes the second passageway and the decoupler is in the stationary position forcing liquid through the first passageway.

13. An engine mount system according to claim 12 wherein the mount exhibits a fourth distinct state of stiffness and damping when the valve opens the second passageway and the decoupler is in the moveable position.

14. An engine mount system according to claim 7 wherein the second pressure is a vacuum.

15. An engine mount system according to claim 7 wherein the valve is a first solenoid valve, and the first solenoid valve has a first output coupled to the first port and a second output coupled to the second port and has a first input coupled to the source of first pressure and a second input coupled to the source of second pressure, and the first pressure is atmospheric pressure and the second pressure is a vacuum, and the processor has at least one input indicative of an operational condition and has an output coupled to an input of the first solenoid valve, and the processor controls the first solenoid valve to selectively apply one of a vacuum or atmospheric pressure to the first and second ports to achieve four distinct states of stiffness and damping.

16. An engine mount system for dampening engine excitation of a vehicle, comprising:
a first four-state engine mount having a first port and a second port;
a second four-state engine mount having a third port and a fourth port;
a first solenoid valve having an output coupled to the first port and to the third port and having a first input configured to be coupled to a source of pressure and a second input configured to be coupled to atmospheric pressure;
a second solenoid valve having an output coupled to the second port and to the fourth port and having a first input configured to be coupled to the source of pressure and a second input configured to be coupled to atmospheric pressure;

a processor having at least one input indicative of an operational condition and having a first output coupled to an input of the first solenoid valve and having a second output coupled to an input of the second solenoid valve to selectively apply the pressure and atmospheric pressure to the first and third ports and second and fourth ports to achieve four distinctive states of stiffness and damping, wherein the pressure is applied to the first port and the atmospheric pressure is applied to the second port in a highway cruise state of the vehicle.

17. An engine mount system according to claim 16 wherein the source of pressure is a vehicle engine vacuum.

* * * * *